United States Patent [19]
Dahroug et al.

[11] Patent Number: 5,289,388
[45] Date of Patent: Feb. 22, 1994

[54] ELECTROHYDRAULIC CONTROL OF A DIE CASTING MACHINE

[75] Inventors: Mohamed E. Dahroug, Windsor, Canada; Yehia M. El-Ibiary, Troy, Mich.; Rajamouli Gunda, Rochester Hills, Mich.; Paul M. Smith, Madison Heights, Mich.; Randall G. Silverthorn, Clarkston, Mich.

[73] Assignee: Vickers, Incorporated, Troy, Mich.

[21] Appl. No.: 341,580

[22] Filed: Apr. 21, 1989

[51] Int. Cl.$^5$ .......................................... G06F 15/20
[52] U.S. Cl. .................................... 364/509; 364/476
[58] Field of Search .................. 364/510, 551.01, 550, 364/506, 509, 175, 174, 167.01, 166, 188, 190, 183, 474.27, 474.25, 474.24, 474.22, 474.07, 476; 91/459, 435, 419, 403, 361, 358 R

[56] References Cited

U.S. PATENT DOCUMENTS

| | | | |
|---|---|---|---|
| 4,460,324 | 7/1984 | Van Appledorn | 91/361 X |
| 4,486,693 | 12/1984 | Hamati et al. | 364/148 X |
| 4,506,321 | 3/1985 | Comstock et al. | 364/174 |
| 4,513,782 | 4/1985 | Contartese et al. | 91/363 R X |
| 4,563,939 | 1/1986 | Siegrist | 91/459 X |
| 4,595,979 | 6/1986 | Arai et al. | 364/174 |
| 4,635,602 | 1/1987 | Walters | 137/625.64 |
| 4,674,053 | 6/1987 | Bannai et al. | 364/476 |
| 4,714,005 | 12/1987 | Leemhuis | 91/361 |
| 4,720,801 | 1/1988 | Boll | 364/510 |
| 4,734,869 | 3/1988 | Mickowski | 364/550 |
| 4,754,413 | 6/1988 | Köster et al. | 364/473 |
| 4,757,747 | 7/1988 | Blatter et al. | 91/363 R X |
| 4,774,674 | 9/1988 | Otake | 364/474 |
| 4,774,675 | 9/1988 | Kagawa | 364/476 |
| 4,823,274 | 4/1989 | Kiya et al. | 364/476 |
| 5,005,116 | 4/1991 | Fujita et al. | 364/188 |

Primary Examiner—Jack B. Harvey
Assistant Examiner—Ellis B. Ramirez
Attorney, Agent, or Firm—Barnes, Kisselle, Raisch, Choate, Whittemore & Hulbert

[57] ABSTRACT

In a die casting machine that includes a shot cylinder having a ram for injecting metal into a die cavity, an electrohydraulic system for controlling operation of the shot cylinder includes an actuator coupled to the shot cylinder ram. A valve supplies hydraulic fluid to the actuator cylinder as a function of valve control signals. Microprocessor-based digital control electronics includes memory for storing a desired ram velocity profile as an incremental function of ram position. The control circuitry is responsive to signals from a sensor coupled to the actuator, indicative of position at the ram, for retrieving corresponding velocity signals from memory and supplying control signals to the valve as a function of such profile velocity signals. The control circuitry further includes facility for adjusting impact of the shot cylinder ram at the end of a cavity-filling stroke as a function of ram and actuator position and/or pressure, independently of the velocity/position profile, to reduce separation and flashing at the die cavity, and to reduce impact wear and fatigue on the overall die casting machine. A keyboard and associated operator display provide operator programmability and selection from a plurality of velocity/position profiles. The actuator and cylinder ram may be advanced in a manual mode of operation for adjustment and calibration proposes. A display associated with the keyboard graphically illustrates desired and actual velocity/position profiles during operation, together with a profile of actuator drive pressure verses position.

5 Claims, 6 Drawing Sheets

ELECTROHYDRAULIC CONTROL OF A DIE CASTING MACHINE

The present invention is directed to control of motion at electrohydraulic actuator systems, and more particularly to control of shot cylinder ram velocity in a die casting machine.

BACKGROUND AND OBJECTS OF THE INVENTION

There are numerous applications in the electrohydraulic control field in which it is desired to control motion at an actuator system and load. In a die casting machine, for example, it is desirable closely to control the profile of motion at the so-called shot cylinder that pushes molten metal into the machine die cavity. Specifically, velocity of the shot cylinder ram must be closely controlled as a function of ram position to obtain optimum machine efficiency and throughput, while maintaining product quality and reducing material waste through die separation and flashing, etc. Wear at the cylinder and die cavity are also reduced, and machine productivity therefore is increased, when both velocity and stroke of the shot cylinder ram can be closely controlled and tailored to die cavity volume and configuration.

It is therefore a general object of the present invention to provide an electrohydraulic actuator system that obtains enhanced and precise control of motion at the actuator and load. Another object of the present invention is to provide a system of the described character that embodies state-of-the-art electronic control capability, and yet is easy and economical to implement both in new system construction and in retrofit of existing systems.

A further and more specific object of the present invention is to provide an electrohydraulic system for controlling velocity at an actuator load, such as the shot cylinder of a die casting machine, as a precise yet programmable function of position. A related object of the invention is to provide a shot cylinder control system for a die casting machine that includes a facility for programming and storing a plurality of operator-selectable velocity versus position control profiles, for adjustment of impact force at the end of the ram stroke for reducing die separation and flashing at the machine, and/or for graphic display of desired and/or actual velocity profile at the hydraulic cylinder and ram. Yet another object of the invention is to provide a shot cylinder control system of the described character that employs PC-compatible or other conventional hardware familiar to the operator, and user-friendly state-of-the-art control programming that is easy to employ and yet features enhanced control precision and versatility.

SUMMARY OF THE INVENTION

An electrohydraulic system for controlling motion at a load coupled to a hydraulic actuator in accordance with a first important aspect of the present invention includes an electrohydraulic valve having a valve element. Hydraulic fluid is supplied to the actuator as a function of position of the valve element, which in turn is controlled by electronic valve control signals supplied to the valve. A first position sensor is coupled to the actuator for providing a corresponding signal as a function of motion at the actuator and load. A second position sensor is coupled to the movable element of the valve for providing a corresponding sensor signal as a function of motion at the valve element. Control electronics includes an inner servo loop that supplies control signals to the valve as a function of a differences between a valve command input signal and the signal from the second sensor coupled to the valve element. An outer servo loop supplies a load position error signal as a function of a difference between a load position command input signal and the signal from the first sensor coupled to the actuator and load. A switch is controlled to select between the load position error signal and a separate valve element position command signal to provide the valve command signal to the inner servo loop. Thus, the control electronics, which is preferably microprocessor-based, includes facility for programmed or manual selection of dual control modes of operation for enhanced control flexibility and precision.

In accordance with a second important aspect of the present invention, the control electronics includes facility for entering a desired profile of velocity versus position or time at the actuator and load. Signals indicative of actual position at the actuator and load are received from the sensor coupled to the load, and corresponding command signals are supplied to the valve for obtaining desired load velocity. Preferably, the control electronics is microprocessor-based and includes facility for receiving and storing a plurality of desired velocity/position profiles and selecting from among the plurality of prestored profiles for operation of the system. Actual velocity/position profile is graphically displayed, preferably superimposed on a graphic display of desired profile for operator observation and adjustment as required.

In a die casting machine in accordance with a preferred implementation of the invention, which includes a shot cylinder having a ram for injecting metal into a die cavity, an electrohydraulic system for controlling operation of the shot cylinder includes an actuator coupled to the shot cylinder ram. A valve supplies hydraulic fluid to the actuator cylinder as a function of valve control signals. Microprocessor-based digital control electronics includes memory for storing a desired ram velocity profile as an incremental function of ram position. The control circuitry is responsive to signals from a sensor coupled to the actuator indicative of position at the ram for retrieving corresponding velocity signals from memory, and supplying control signals to the valve as a function of such profile velocity signals. The control circuitry further includes facility for adjusting impact of the shot cylinder ram at the end of a cavity-filling stroke as a function of ram and actuator position and/or pressure independently of the velocity/position profile to reduce separation and flashing at the die cavity, and to reduce impact wear and fatigue on the overall die casting machine. A keyboard and associated operator display provide operator programmability and selection from a plurality of velocity/position profiles. The actuator and cylinder ram may be advanced in a manual mode of operation for adjustment and calibration proposes. A display associated with the keyboard graphically illustrates desired and actual velocity/position profiles during operation, together with a profile of actuator drive pressure versus position.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
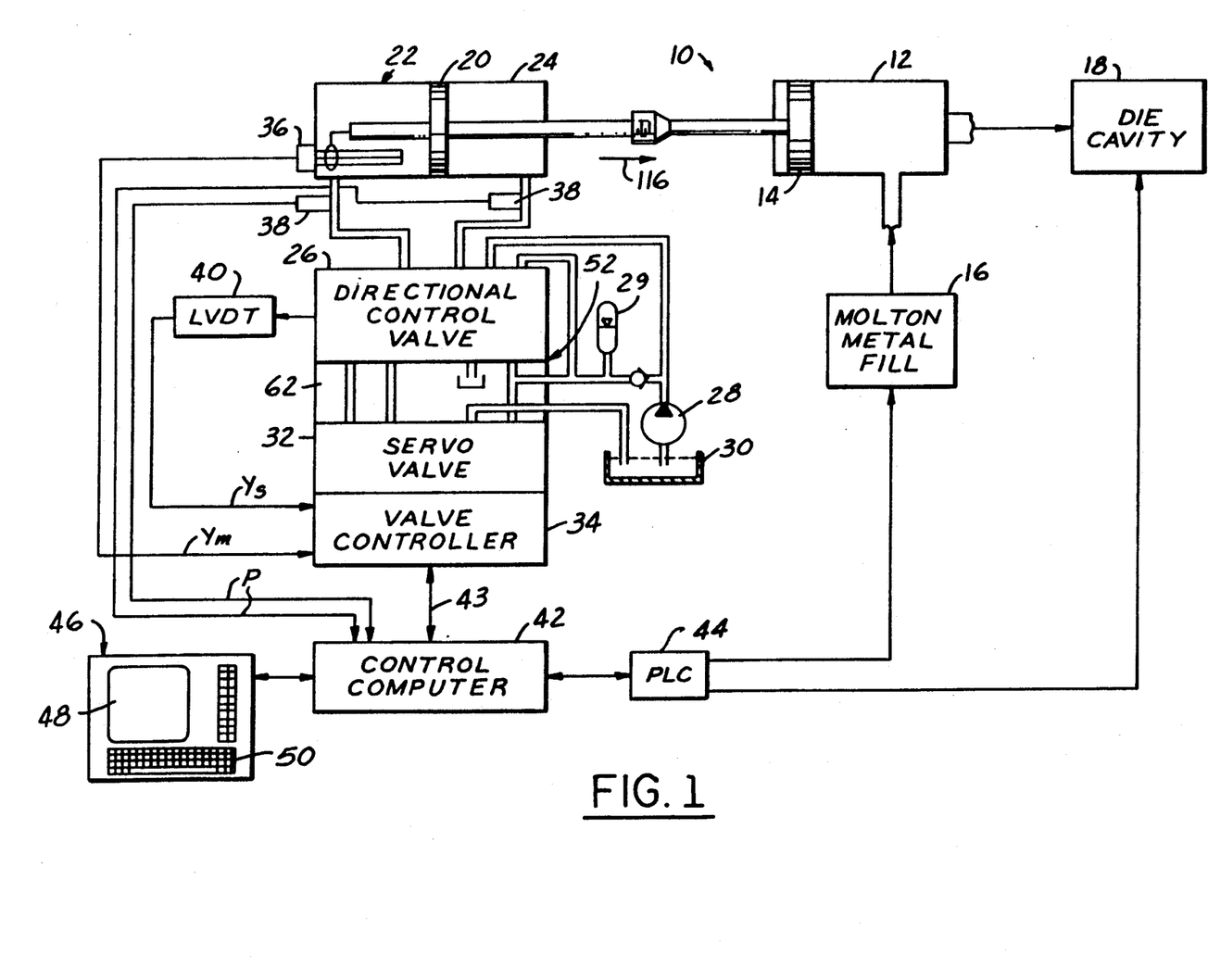
FIG. 1 is a functional block diagram of a die casting machine and associated control system in accordance with a presently preferred implementation of the invention.

FIG. 1 illustrates a die casting machine 10 that includes a shot cylinder 12 having a ram 14 for forcing metal from a reservoir 16 into a die cavity 18. Ram 14 is coupled to the piston 20 of a hydraulic actuator 22. The cylinder 24 of actuator 22 is connected by suitable hydraulic lines to a directional control valve 26 that receives hydraulic fluid from a pump 28, an accumulator 29 and a reservoir 30 under control of a servo valve 32. Directional control valve 26 boosts or amplifies the output flow of valve 32 to a level necessary to operate actuator 22 and ram 14. A valve controller 34 supplies valve control signals to the torque motor of servo valve 32. An electro-acoustic sensor 36 is mounted on cylinder 24 of actuator 22 and supplies a signal Ym to valve controller 34 indicative of position of actuator piston 20 within cylinder 24. A pair of pressure sensors 38 are responsive to pressure of hydraulic fluid on both sides of actuator piston 20 for supplying corresponding signals P to controller 42 indicative of fluid pressure. An LVDT 40 is coupled to the valve element of directional control valve 26 for supplying a corresponding signal Ys to controller 34 indicative of element position. (In systems of lower hydraulic capacity that do not require a boost valve 26, LVDT 40 may be coupled to the valve element of servo valve 32.

A control computer 42 is connected to valve controller 34, preferably by a high-speed bidirectional serial data bus 43, for supplying input command signals to the valve controller and receiving signals from the valve controller indicative of system operation. Control computer 42 also receives actuator position signal Ym from sensor 36 through controller 34 and bus 43. A programmable logic controller or PLC 44 is connected to control computer 42. PLC 44 also controls die cavity 18 for opening and closing the die elements, and reservoir 16 for selectively filling shot cylinder 12. An operator console 46 is connected to control computer 42. Console 46 includes a screen 48 for graphic display of pressure and velocity profiles as will be described, and a keyboard 50 for operator entry and modification of profile information and other operating parameters. Preferably, keyboard 50 is of standard IBM PC or compatible configuration.

Figure 2:
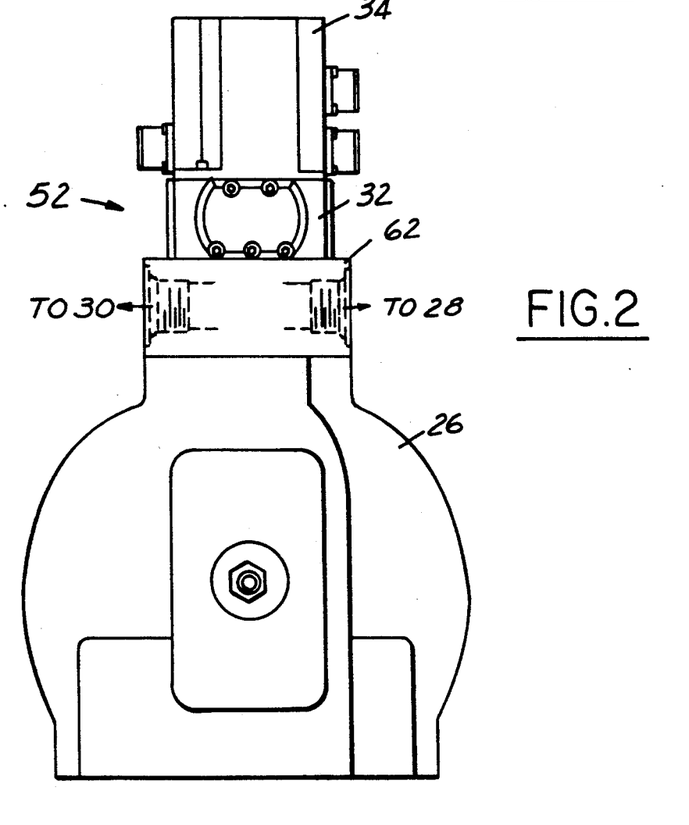
FIG. 2 is a side elevational view of the valve and associated controller assembly illustrated functionally in FIG. 1.
Figure 3:
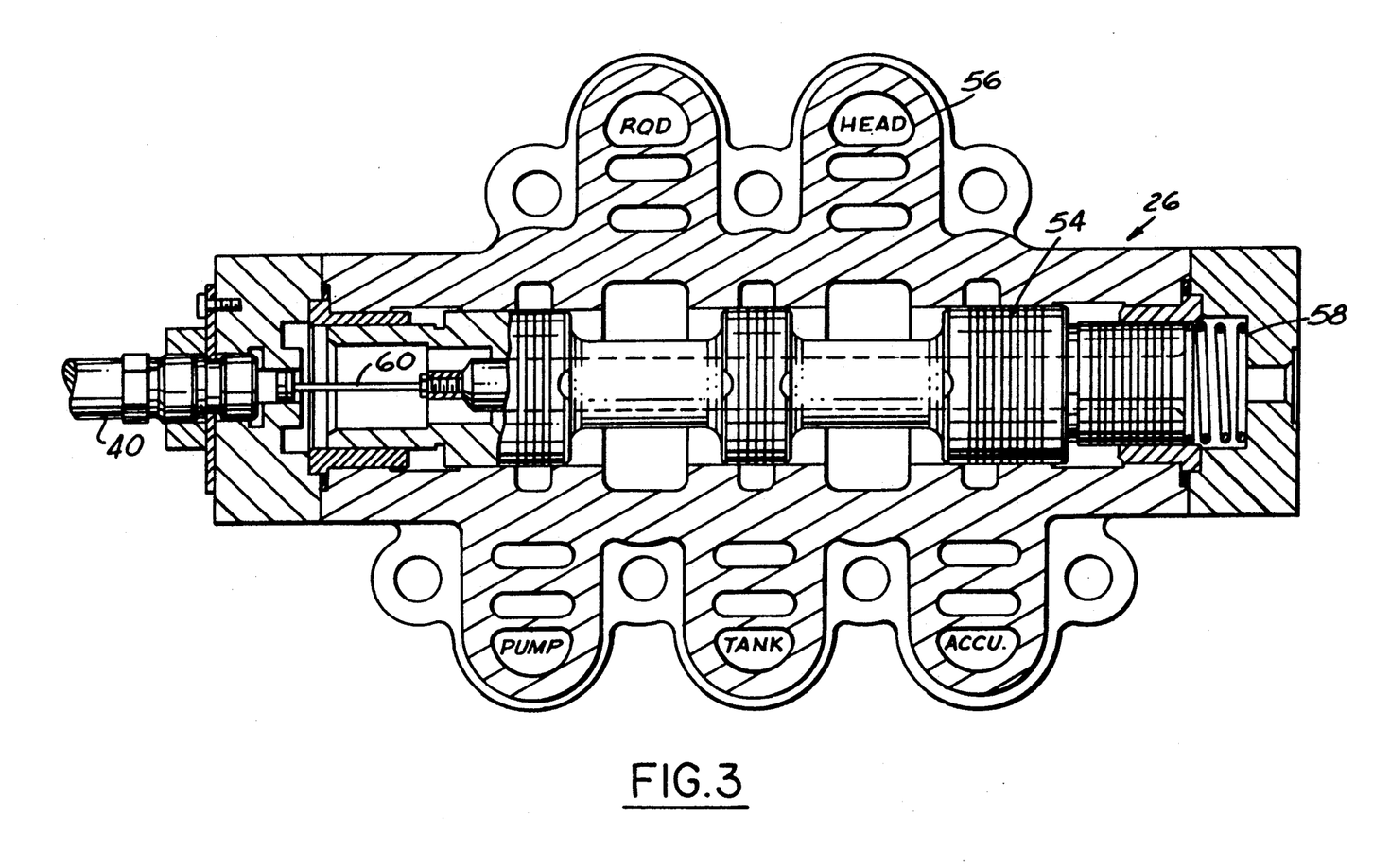
FIG. 3 is a section view of the hydraulic directional control valve illustrated in FIGS. 1 and 2.

Directional control valve 26, servo valve 32 and valve controller 34 preferably take the form of a unitary assembly 52 (FIGS. 1-3). Valve 26 includes a spool 54 (FIG. 3) mounted within a housing or manifold 56 for controlling the flow of hydraulic fluid through the various manifold control passages. A spring 58 is positioned adjacent to one end of spool 54 and urges the spool to a full-reverse position for terminating operation of actuator 22 (FIG. 1) and shot cylinder 12 in the event of system failure. LVDT 40 is mounted on housing 56 and has a rod 60 connected to the opposing end of spool 54. Servo valve 32 (FIGS. 1 and 2) is mounted by a tap plate 62 on housing 56 of directional control valve 26. Tap plate 62 provides for pilot connection to pump 28 and reservoir 30 (FIG. 1). Fluid supply to directional valve 26 and actuator 22 is obtained through manifold valve 56. Valve 26 has two supply sources: "pump" (FIG. 3) for limited reverse travel and "accumulator" for high-speed extension. Valve controller 34 is mounted on servo valve 32 and has multiple connectors for connection to control computer 42, LVDT 40, pressure sensor 38 and electro-acoustic sensor 36 (FIG. 1).

U.S. Pat. No. 4,757,747 discloses a presently preferred embodiment of controller 34 and servo valve 32 in a unitary assembly that includes microprocessor-based control electronics for providing control signals to the torque motor of valve 32. The control electronics disclosed in such patent also includes facility for actuating electro-acoustic sensor 36 and receiving therefrom signals Ym indicative of actuator piston position. U.S. Pat. No. 4,811,561 discloses an electrohydraulic system that includes actuators with associated servo valves and controllers coupled to a master controller by a high-speed bidirectional serial communication and control bus 43. U.S. Pat. No. 4,635,682 discloses a valve control system that includes electrohydraulic pilot and main valve stages, and selectable position and flow control loops. The disclosures of such U.S. Patents, all assigned to the assignee hereof, are incorporated herein by reference.

Figure 4:
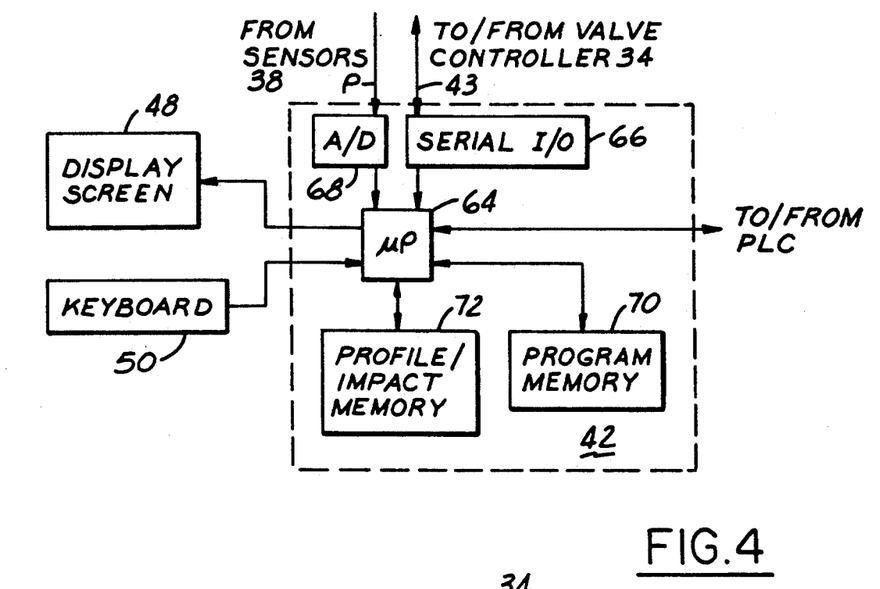
FIG. 4 is a functional block diagram of the machine control computer in FIG. 1.

FIG. 4 is a functional block diagram of control computer 42, which includes a microprocessor 64 having I/O ports for connection to PLC 44, display screen 48 and keyboard 50. Microprocessor 64 is also connected through a serial I/O coupler 66 and through bus 43 to valve controller 34, and receives signals from sensors 38 through an A/D converter 68. A program memory 70, such as an EPROM, contains suitable programming and algorithms for operation of computer 42. A second memory 72, such as a batteried RAM, provides for storage of multiple velocity/position and ram impact profiles as will be discussed.

Figure 5:
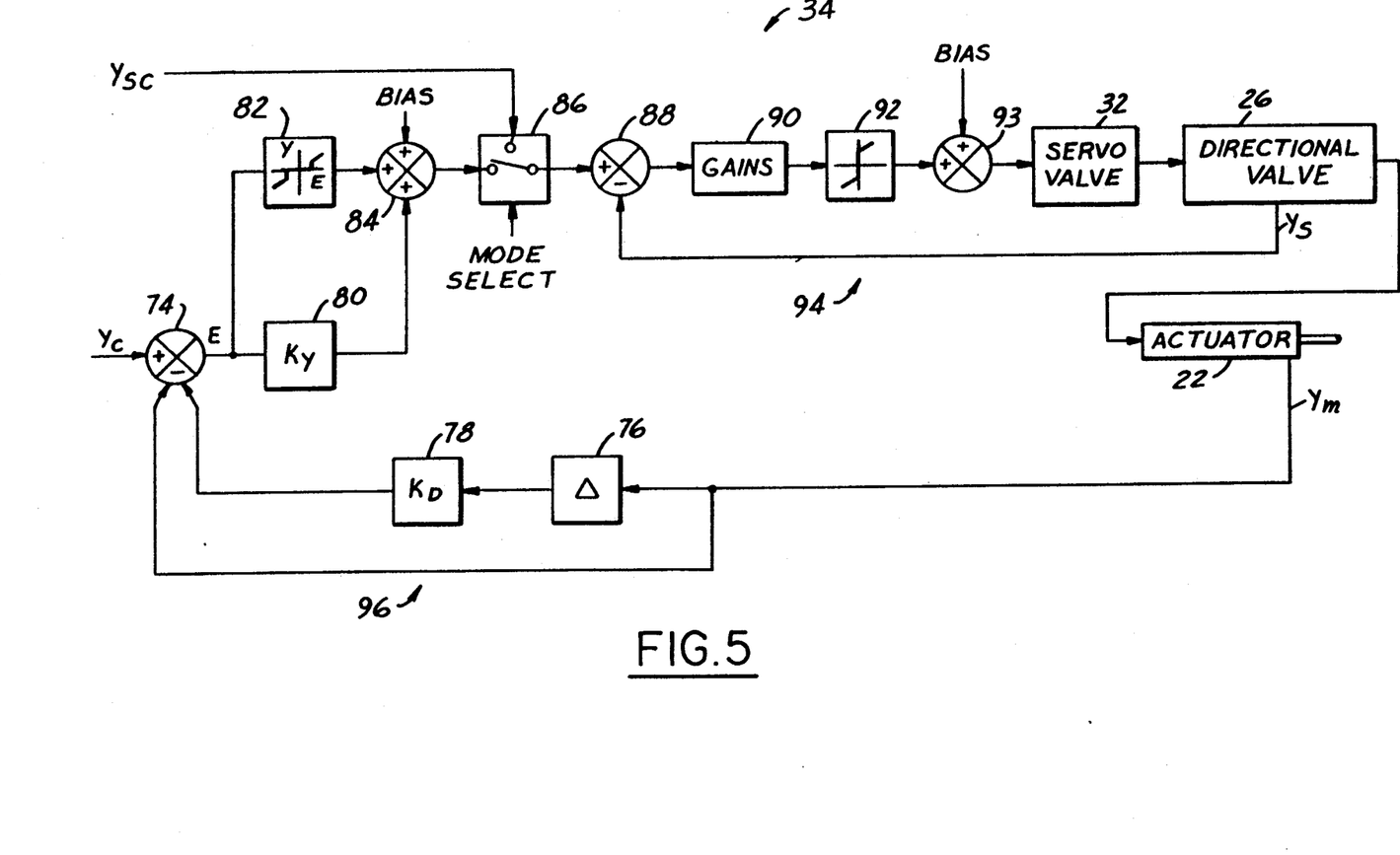
FIG. 5 is a functional block diagram of the valve controller in FIG. 1.

FIG. 5 is a functional block diagram of valve controller 34 coupled to servo valve 32, directional control valve 26 and actuator 22 in a presently preferred mode of valve controller operation. A comparator 74 receives an input load position command signals Yc (from control computer 42 in FIG. 1). Sensor signal Ym is fed to a second input of comparator 74, and through a differentiator 76 and a gain stage 78 to a third comparator input. Comparator 74 thus effectively receives from sensor 36 (FIG. 1) a composite signal indicative of actual position at the actuator and load that has been filtered at stages 76, 78 to mask transient variations. An output E, indicative of the difference or error between desired and actual load position signals, is fed through a gain stage 80 and a deadband jumper 82 to respective inputs of a summing junction 84. Jumper 82 helps eliminate error due to lag ana non-linearity of valve motion. The output of comparator 84, adjusted for actuator bias, is fed to one input of a mode-selection switch 86. The second input of switch 86 receives a command signal Ysc from control computer 42 indicative of desired position of directional control valve element 54 (FIG. 3), and the output of switch 86 is fed to a comparator 88. Comparator 88 also receives output signal Ys from directional control valve LVDT 40 (FIGS. 1 and 3), and provides a valve command signal output as a function of a difference therebetween. This output, fed through an appropriate gain stage 90 and deadband jumper 92, and adjusted at 93 for servo and directional valve bias, is supplied as a valve control signal to the torque motor of servo valve 32.

Thus, valve controller 34 includes an inner servo control loop 94 that supplies control signals to the torque motor of servo valve 32 as a function of a difference between the valve command input signal from switch 86 and LVDT sensor signal Ys. An outer servo control loop 96 receives load position command Yc, and provides an error signal E as a function of a difference between such load position command signal and actual load position signal Ym. Switch 86 connects either error signal E or valve element command signal Ysc to inner loop 94. The double-loop control scheme of FIG. 5 provides enhanced versatility and accuracy of control of either the control valve element or actual actuator position.

Figure 6:
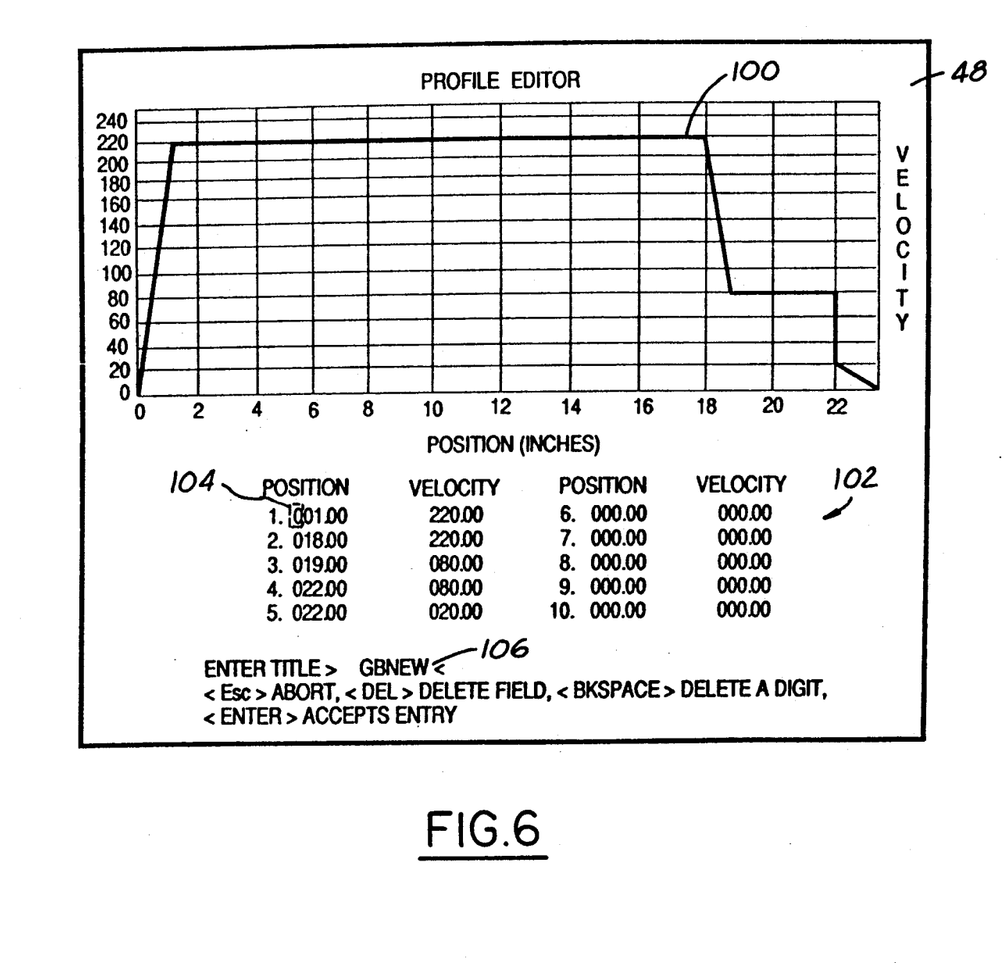
FIGS. 6 and 7 are graphic illustrations useful in discussing operation of the invention.

Control computer 42 includes menu-driven programming in memory 70 (FIG. 4) for automatic and manual control modes, a shot profile entry/edit mode, and tuning, calibration, system configuration and diagnostic modes of operation. In the profile entry/edit mode of operation, the operator is prompted at screen 48 to enter a desired velocity/position profile at keyboard 50. (The operator also has the option of entering a velocity/time profile.) FIG. 6 illustrates display 48 following entry by the operator of a desired velocity/position profile 100. This profile is entered by movement of the screen cursor 104 among the various incremental position/velocity indicia 102 and entry of appropriate information at keyboard 50. In the example of FIG. 6, the operator has indicated that, at a position of 1.00 inches from start of operation, an actuator and ram velocity of 220.00 inches per second is desired. This desired velocity is to remain constant up to a position of 18.00 inches, followed by a decrease to a velocity of 80.00 inches per second at a position of 19.00 inches, constant velocity up to a position of 22.00 inches, a decrease at that position to 20.00 inches per second, and a decrease to zero velocity at the full stroke position of 22.5 inches. It is thus necessary to enter only points of velocity change. Control computer 42 automatically completes profile graph 100 between the selected change points, and displays such profile as illustrated in FIG. 6. In the event that a modification is desired, the operator may shift screen cursor 104 to the appropriate screen location, and enter the corresponding desired change in position or velocity. A title 106 is selected by the operator and assigned to the profile, and the profile is stored under that title in memory 72 (FIG. 4) by depression of the ENTER key at keyboard 50. Thereafter, the profile of FIG. 6 may be modified as desired by simply recalling the profile by title (GBNEW in the example of FIG. 6) and entering desired changes.

Figure 7:
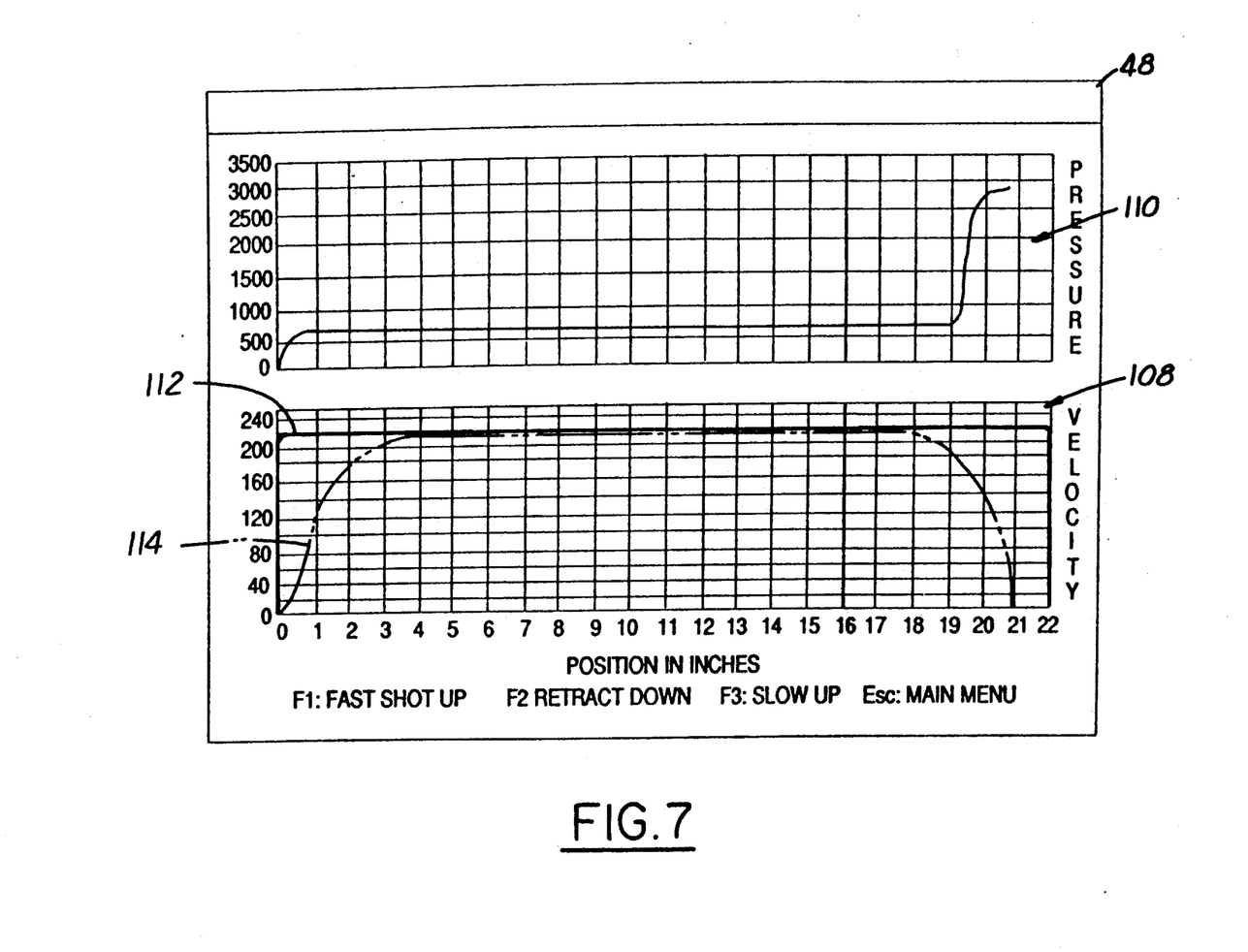

In the manual and automatic modes of operation, screen 48 is configured to contain two graphic displays 108, 110 (FIG. 7). Display 108 contains superimposed images of desired and actual position/velocity profiles, and display 110 illustrates actual pressure/position profile obtained during system operation. Initially, in a manual mode of operation for which an exemplary display is illustrated in FIG. 7, the operator selects a preprogrammed velocity/position profile, and this profile 112 is displayed. In the exemplary profile 112, the operator desires to increase velocity at actuator 22 and shot cylinder 12 (FIG. 1) rapidly to a velocity of 220 inches per second, and to maintain this velocity throughout the entire stroke of 22 inches. (Stroke length is selectable, with different lengths being illustrated in FIGS. 6 and 7 for purposes of example.) Upon depression of the F1 function key at keyboard 50, actuator 22 is driven by computer 42 and controller 34 through a complete stroke in the cavity-filling direction 116 (FIG. 1). At each incremental position of actuator piston 20, the corresponding actual velocity is determined as a function of a change in position feedback signal Ym, and the computed velocity is graphically displayed at 114. Likewise, actuator drive pressure P (FIG. 1) is read for incremental display at 110. The operator may thus observe actual versus desired velocity/position profile, as well as changes in hydraulic pressure corresponding to such profile. Desired modifications may be made by returning to the profile editor mode of operation (FIG. 6). Upon completion of a stroke, the shot cylinder and actuator may be retracted to the original or home positions (FIG. 1) by depression of the F2 function key. The F3 function key provides for slow execution of a stroke for calibration or maintenance proposes.

In the automatic mode of operation, selectable by the operator from the main menu at display 48 (FIG. 1), the displays at screen 48 are similar to those illustrated in FIG. 7, with the exception that automatic mode status is displayed along the bottom of the screen rather then the manual function key selections illustrated in FIG. 7. Control computer 42 automatically displays actual velocity/position profile 114 and pressure profile 110 of the most recent ten shots, preferably in different colors so that the operator may observe any changes in operation. Each "shot" is initiated by a command signal from PLC, which among other functions correspondingly controls reservoir 16 and die cavity 18 (FIG. 1). Status information is transmitted to PLC for management information and control purposes.

In a calibration mode of operation, the operator has the ability to calibrate the end positions of the actuator, and also to adjust actuator speed through adjustment of fluid flow to the actuator from directional control valve 26. Return velocity of actuator 22 and ram 14 are preferably constant, and set at this point. Likewise, in a system configuration mode of operation, desired maximum velocities, pressure, stroke length and other parameters may be entered by the operator.

Velocity of the actuator and shot cylinder at the end of a cavity-filling stroke, and thus impact of the shot cylinder when the cavity is full, may be adjusted to reduce separation of the die elements and consequent flash of material out of the die. This is accomplished by selection of the desired impact level (0 through 9) in the configuration mode, the shot profile entry/edit mode or the automatic mode. The selected value corresponds to a predefined acceleration profile near the end of the stroke. This profile is based upon the actual position of actuator 22 and/or the pressure signals from sensors 38.

We claim:

1. An electrohydraulic system for controlling motion of a load comprising:

hydraulic actuation means for coupling to the load, electrohydraulic valve means that includes a valve element, means for supplying hydraulic fluid to said actuation means as a function of position of said valve element, and means responsive to electronic valve control signals for controlling position of said valve element, and electronic valve control means that includes first sensor means coupled to said actuation means for providing a first sensor signal as a function of motion at the load, second sensor means coupled to said electrohydraulic valve means for providing a second sensor signal as a function of motion at said valve element, means for receiving first and second command signals as functions of desired motion at the load and valve element respectively, means for providing an error signal as a function of a difference between said first command signal and said first sensor signal, means for selecting between said error signal and said second command signal to provide a command signal, and means for providing said valve control signals as a function of a difference between said command control signal and said second sensor signal.

2. The system set forth in claim 1 wherein said first and second command signals comprises respective position command signals, and wherein said first and second sensors supply said sensor signals as respective functions of position at said load and valve element.

3. The system set forth in claim 2 wherein said error-signal providing means includes means for differentiating said first sensor signal.

4. An electrohydraulic system for controlling position of a load coupled to a hydraulic actuator comprising:

electrohydraulic valve means that includes a valve element, means for supplying hydraulic fluid to the actuator as a function of position of said valve element, and means responsive to electronic valve control signals for controlling position of said valve element, a first position sensor coupled to said actuator for providing a first sensor signal as a function of position of the load, a second position sensor coupled to said valve element for providing a second sensor signal as a function of position of said valve element, an inner electronic servo control loop that includes means for supplying said valve control signals as a function of a difference between a valve command signal and said second sensor signal, an outer electronic servo control loop that includes means for receiving a load position command signal, and means for supplying a load position error signal as a function of a difference between said load position command signal and said first sensor signal, means for receiving a valve element position command signal, and means for selecting between said load position error signal and said valve element position command signal to provide said valve command signal to said inner servo loop.

5. The system set forth in claim 4 wherein said outer servo control loop includes means for differentiating said first sensor signal to filter said first sensor signal.

* * * * *